No. 823,952. PATENTED JUNE 19, 1906.
E. W. LUCAS.
WOODWORKING MACHINE.
APPLICATION FILED FEB. 11, 1905.
2 SHEETS—SHEET 1.
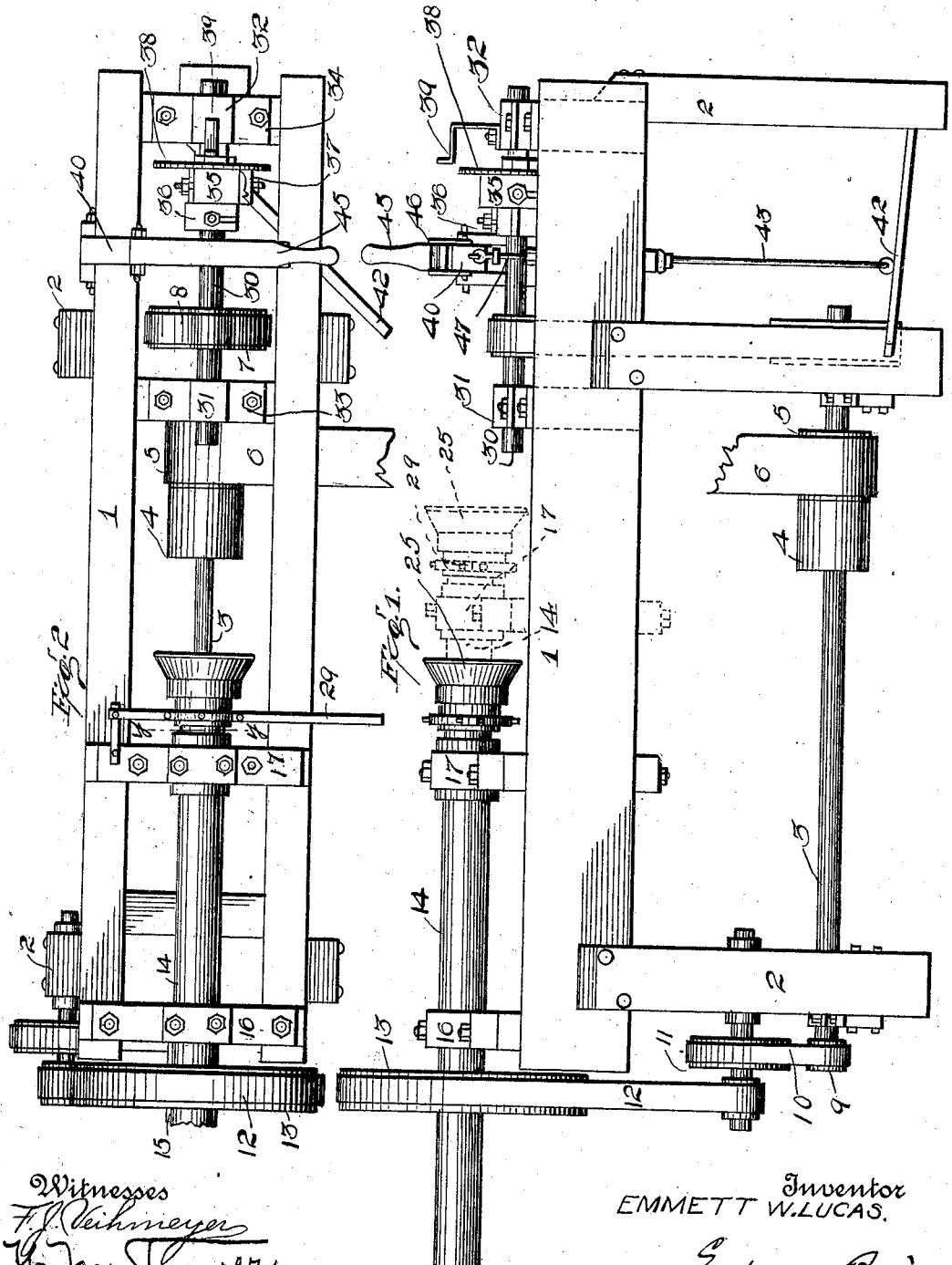
Witnesses
F. J. Veihmeyer
K. M. Tower
Inventor
EMMETT W. LUCAS.
BY Edson Bros,
Attorneys

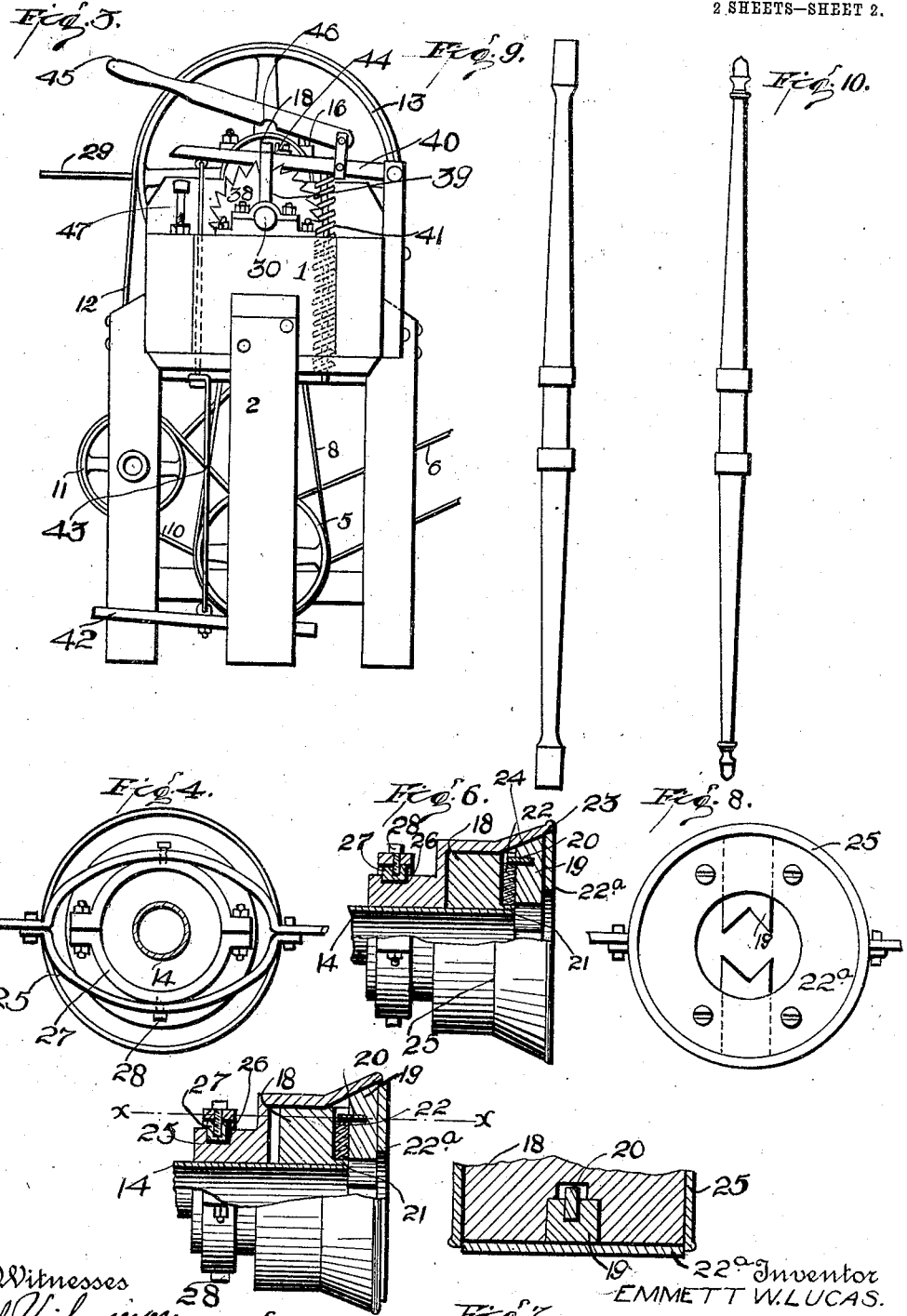

UNITED STATES PATENT OFFICE.

EMMETT W. LUCAS, OF FAYETTEVILLE, ARKANSAS.

WOODWORKING-MACHINE.

No. 823,952.     Specification of Letters Patent.     Patented June 19, 1906.

Application filed February 11, 1905. Serial No. 245,249.

*To all whom it may concern:*

Be it known that I, EMMETT W. LUCAS, a citizen of the United States, residing at Fayetteville, in the county of Washington and State of Arkansas, have invented certain new and useful Improvements in Woodworking-Machines; and I do hereby declare the following to be a full, clear, and exact description of the invention, such as will enable others skilled in the art to which it appertains to make and use the same.

My invention relates to improvements in woodworking machines or lathes, more particularly adapted for forming the ends of neck-yokes which are usually cut in the shape of an acorn; and for this reason the machine or lathe is known as an "acorn-cutter."

It has for its object, among others, to provide a machine which is adapted to hold and shape different sizes of stock, to provide means for clutching the stock and at the same time permitting it to revolve to provide means for cutting off any superfluous material at the end of the stock and then shaping the end of the piece without the use of centers, and to provide means to hold and gage the work in the machine.

Other objects of my invention will become apparent as the construction and operation of the machine are described.

The invention consists in the details of construction and the combination of parts hereinafter described, and more particularly pointed out in the claims concluding this specification.

In the accompanying drawings, illustrating the preferred embodiment of my invention, Figure 1 is a side elevation of a machine made in accordance with my invention, different positions of the bearing, spindle, and chuck being shown in dotted lines. Fig. 2 is a top plan view thereof. Fig. 3 is a right-hand end view thereof. Fig. 4 is a sectional view on the line *y y* of Fig. 2, with the ends of the lever for operating the chuck broken away. Fig. 5 is a broken detail view of the chuck, partly in central section, with the jaws open. Fig. 6 is a similar view with the jaws closed. Fig. 7 is a broken sectional view on the line *x x* of Fig. 5, showing the sliding connection between the jaws of the chuck and the chuck-body. Fig. 8 is a face view of the chuck; and Figs. 9 and 10 are views, respectively, of a neck-yoke before and after having its ends cut in my machine.

While one embodiment of my invention is fully illustrated in the accompanying drawings and its construction and operation are clearly described in this specification, I reserve the right to make such changes from the construction shown and described as the scope of the claims hereto appended will permit.

In carrying out my invention I provide a hollow spindle carrying a clutch at one end and a drive-pulley at the other and adapted to be moved longitudinally in its bearings and in the drive-pulley to adjust it for use on different lengths of material. To adjust the spindle lengthwise, it is necessary to loosen the bolts that clamp the bearing next to the chuck to the longitudinal bars of the frame and slide said bearing along said bars, letting the spindle slip through the other bearing, and finally moving the pulley along the spindle to keep it in proper alinement with its driver, as shown in dotted lines, Fig. 1. The clutch is operated by a pivoted lever having loose connection with a groove in a sleeve adapted to clamp the jaws upon the strip. At the other end of the machine is mounted an arbor carrying a cutter-head provided with knives shaped to cut the acorn and a circular saw to cut off the end of the piece when it is too long. This end of the piece to be shaped is supported upon a lever seated upon a spring normally holding it above the level of the top of the knives and saw of the cutter-head. Said lever carries a guide or stop for the work and has pivoted to the upper edge thereof another lever adapted to fit above the work and in connection with the guide on the lower lever hold said work in position over the knives while permitting it to revolve. Means are provided for depressing the levers to bring the end of the piece of work into engagement first with the saw and then with the knives. An adjustable stop to limit the downward movement of the levers is provided. A main power-shaft is mounted below the body of the machine, from which belt connection is had with the arbor and the drive-wheel on the spindle, the latter through an intermediate counter-shaft, whereby the speed of the spindle is greatly reduced as compared with that of the arbor.

Referring more particularly to the drawings, 1 is the body or bed plate or frame of the machine suitably supported upon legs 2, between two of which is mounted the main drive-shaft 3, carrying fast and loose pulleys 4 5 for the main drive-belt 6 and a pulley 7, over which works the belt 8 to operate the arbor presently described. Said main shaft also carries a pulley 9, connecting, by means of a belt 10, with another pulley 11 on an intermediate counter-shaft 11, carrying a second shaft having belt connections 12 with the drive-wheel 13 on the tubular spindle 14. Said spindle has suitable sliding connections with the drive-wheel 13, such as the long key 15 shown, and said spindle is journaled in cross-bars 16 and 17. Fixedly connected around the end of said spindle is the chuck-body 18, having oppositely-arranged slidably-mounted jaws 19, each provided with lugs 20, between which and a shoulder 21 on the chuck-body are arranged springs 22, the tendency of which are to force said jaws outward. Said jaws are secured to the chuck-body by a circular plate 22$^a$, screwed or otherwise secured to said chuck-body. It is obvious, however, that any suitable form of sliding connection, such as dovetail, &c., may be employed. The ends of said jaws are beveled outwardly, as at 23, and engage the flared portion 24 of the sleeve 25, fitting over the chuck-body and spindle. Said sleeve has a groove 26, in which is arranged a strap or ring 27, having pivotal connections 28 above and below, with a hand-lever 29 pivoted vertically to the frame of the machine. By means of said lever the sleeve may be thrust upon the chuck-body with its bevel-ended jaws and force said jaws toward each other to grip the work.

The arbor 30 is journaled in journal-boxes 31 32 on cross-pieces 33 34 at the other end of the machine. Said arbor is arranged on a lower plane than the spindle and carries a cutter-head 35, having two sets of adjustable knives, one set 36 having straight edges adapted to trim up to the inner bead of the acorn, and the other set 37 having their edges (shown in Fig. 1) adapted to form the acorn itself. A circular saw 38 is secured to the outer end of the cutter-head and extends beyond the same to cut off the end of the yoke-bar when it is too long. Beyond the saw is a gage 39, against which the end of the yoke-stock is placed when it is arranged in the machine. A pivoted lever 40 is seated on a coiled spring 41 and extends across above the arbor and is connected to a foot piece or treadle 42 at its free end by means of a rod 43. Said lever has a stop 44 to hold the yoke-stock over the saw and knives, and a second lever 45 is pivoted to its upper edge and has a groove 46 in its lower edge adapted to fit over the yoke-stock and hold it in place, while permitting it to rotate. A stop 47, comprising a screw-threaded bolt adapted to be screwed up and down in the table, is arranged below the free end of the lever 40 to limit its downward movement.

The operation of the machine is as follows: One end of the neck-yoke stock shown in Fig. 9 is placed in the chuck and the other end placed against the gage 39 and resting upon the lever 40 against the stop 44. It will be noted that the lever is high enough in its normal position to prevent work laid upon it coming in contact with the saw or knives. The hand-lever 45 is then depressed, forming, with the lever 40 and stop 44, a bearing in which the yoke-stock may revolve. The yoke-stock is next clamped in the chuck by operating the lever 5, as before described. The yoke then begins to rotate, the spindle making about twenty-five revolutions per minute. The operator then depresses the lever 40 by means of the treadle 42, thus bringing the yoke-stock against the saw and finally against the knives on the cutter-head. The arbor carrying said saw and knives revolves at a speed of about fifty-four hundred revolutions a minute. The lever is pressed steadily downward until it comes in contact with the stop 47 when the cutting of the acorn on that end will have been completed, which is done when the yoke-stock has made one revolution. The treadle is then released and the lever 40 regains its normal position under the impulse of the spring upon which it is seated. The yoke-stock is then taken out, reversed, and the other end finished in the same manner.

It will be noted that stock of great length may be shaped on my machine if their diameters are not too great for the spindle, and even the spindle may be enlarged to suit the requirements. It will also be noted that by the use of my machine the cutting of each end is completed at one operation, whereas heretofore in forming an acorn on a lathe with centers it was necessary to leave a piece on the end to hold the center, which piece had to be broken or cut off afterward and the end shaped by a separate operation.

Having thus described my invention, what I claim as new, and desire to secure by Letters Patent, is—

1. In a machine of the character described, the combination with a revoluble chuck adapted to hold one end of a yoke-stock, of a pivoted lever having a stop to support the other end of said stock, a second lever pivoted above the first and adapted to form with the first lever and its stop a bearing for the stock, a gage to adjust the free end of the stock, an arbor carrying a cutter-head, means to depress said levers to bring the stock in contact with the knives of the cutter-head, and means to rotate said chuck and arbor.

2. In a machine of the character described, the combination with a tubular spindle carrying a chuck adapted to hold one end of the yoke-stock, of a pivoted lever having a stop to support the other end of said stock, a second lever pivoted above the first and adapted to form with the first lever and its stop a bearing for the stock, an arbor carrying a cutter-head, means to depress said levers to bring the stock in contact with the knives of the cutter-heads, a stop to limit the downward movement of said lever and means to rotate said chuck and arbor.

3. In a machine of the character described, the combination with a revoluble chuck adapted to hold one end of a yoke-stock, of a pivoted lever having a stop to support the other end of said stock, a second lever pivoted above the first and adapted to form with the first lever and its stop a bearing for the stock, an arbor carrying a cutter-head, means to depress said levers to bring the stock in contact with the knives of the cutter-head, and means to rotate said chuck and arbor.

4. In a machine of the character described, the combination with a revoluble chuck adapted to hold one end of a yoke-stock, of a pivoted lever having a stop to support the other end of said stock, a second lever pivoted above the first and adapted to form with the first lever and its stop a bearing for the stock, an arbor carrying a cutter-head and a saw, means to depress said levers to bring the stock in contact with the knives of the cutter-head and with the saw, and means to rotate said chuck and arbor.

5. In a machine of the character described, the combination with a revoluble chuck adapted to hold one end of a yoke-stock, of a pivoted lever having a stop to support the other end of said stock, a second lever pivoted above the first and adapted to form with the first lever and its stop a bearing for the stock, an arbor carrying a cutter-head, means to depress said levers to bring the stock in contact with the knives of the cutter-head, a stop to limit the downward movement of said lever, a gage to adjust the free end of the stop, and means to rotate said chuck and arbor.

6. In a machine of the character described, the combination with a revoluble chuck adapted to hold one end of a yoke-stock, of a pivoted lever having a stop to support the other end of said stock, a second lever pivoted above the first and adapted to form with the first lever and its stop a bearing for the stock, an arbor carrying a cutter-head, a treadle attached to the free end of said first-mentioned lever to depress said lever to bring the stock into contact with the knives of the cutter-head, a stop to limit the downward movement of said lever, and means to rotate the chuck and arbor.

7. In a machine of the character described, the combination with a revoluble chuck adapted to hold one end of a yoke-stock, of a pivoted lever having a stop to support the other end of said stock, a second lever pivoted above the first and adapted to form with the first lever and its stop a bearing for the stock, a gage to adjust the free end of the stock, an arbor carrying a cutter-head, a treadle attached to the free end of said first-mentioned lever to depress said lever to bring the stock into contact with the knives of the cutter-head, a stop to limit the downward movement of said lever, and means to rotate said chuck and arbor.

8. In a machine of the character described, the combination with a tubular spindle carrying a chuck adapted to hold one end of a yoke-stock, of a pivoted lever having a stop to support the other end of said stock, a second lever pivoted above the first and adapted to form with the first lever and its stop a bearing for the stock, an arbor carrying a cutter-head, a treadle attached to the free end of said first-mentioned lever to depress said lever to bring the stock into contact with the knives of the cutter-head, a stop to limit the downward movement of said lever, and means to rotate said chuck and arbor.

In testimony whereof I affix my signature in presence of two witnesses.

EMMETT W. LUCAS.

Witnesses:
SILAS M. BRYANT,
LESLIE H. WASTON.